May 8, 1956 — H. DICKINSON — 2,745,087

REMOTE INDICATING SYSTEM

Filed June 22, 1953 — 3 Sheets-Sheet 1

INVENTOR.
HORACE DICKINSON
BY Lyon & Lyon
ATTORNEYS

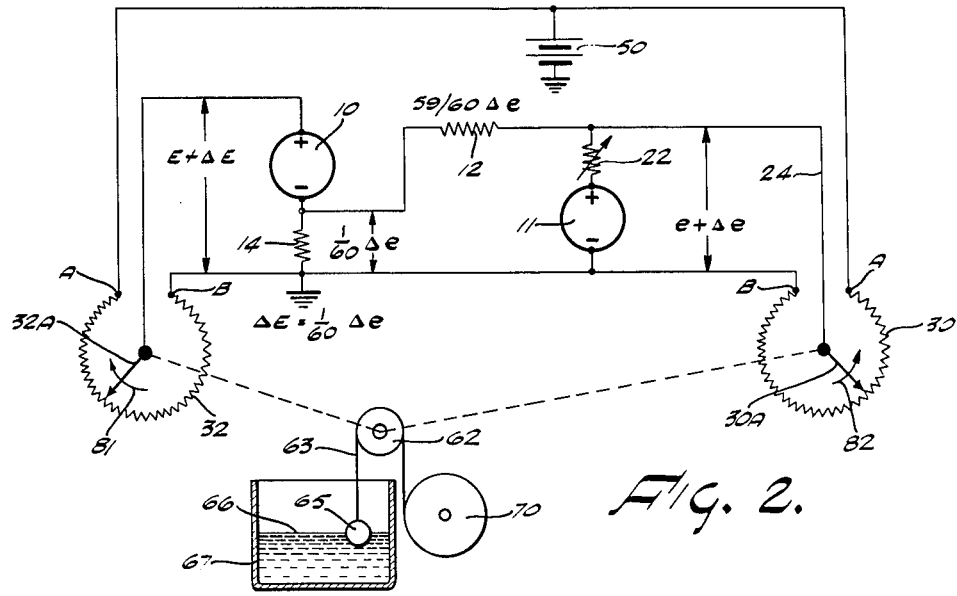
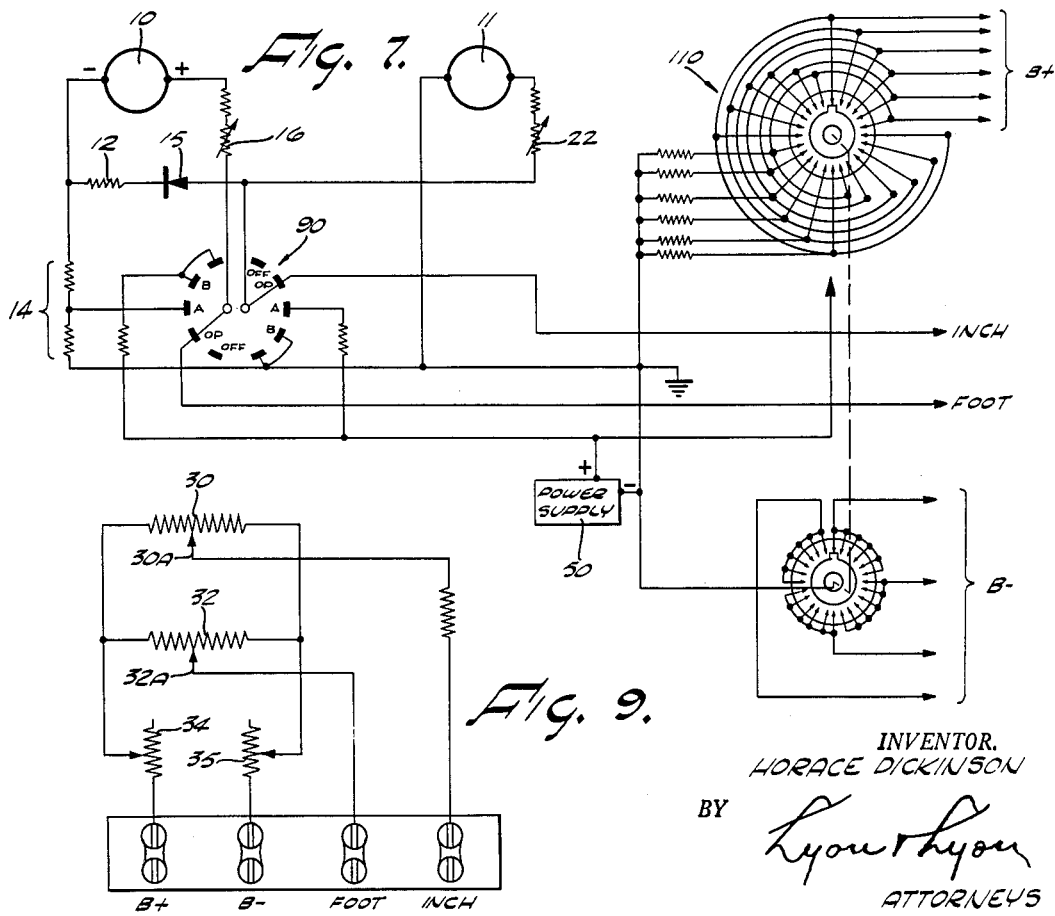

May 8, 1956 H. DICKINSON 2,745,087
REMOTE INDICATING SYSTEM
Filed June 22, 1953 3 Sheets-Sheet 3

INVENTOR.
HORACE DICKINSON
BY Lyon & Lyon
ATTORNEYS

United States Patent Office 2,745,087
Patented May 8, 1956

2,745,087

REMOTE INDICATING SYSTEM

Horace Dickinson, South Gate, Calif., assignor to Vapor Recovery Systems Co., Compton, Calif., a corporation of California Application June 22, 1953, Serial No. 363,182

4 Claims. (Cl. 340—177)

The present invention relates to improved means and techniques for producing indications of certain conditions which exist at remote locations, and have specific reference to a system for indicating the level of liquid in remotely located tanks in terms of indications on two voltmeters, one of such voltmeters being calibrated in terms of "feet" and the other voltmeter being calibrated in terms of "inches."

It is desirable to indicate certain conditions as, for example, the level of liquid in a remotely located tank in terms of feet and inches, using equipment which is simple, reliable, inexpensive, foolproof and easy to adjust. Also, equipment of this character is desirably adaptable to indicate such condition at one of a plurality of selectable locations. Further, equipment of this character is desirably adaptable so that the same may be duplicated, without difficulty, to indicate the aforementioned condition simultaneously at a plurality of stations, all of which are effective simultaneously to indicate the same condition.

It is, therefore, a general object of the present invention to provide improved means and techniques whereby the aforementioned desirable features may be accomplished.

Another object of the present invention is to provide apparatus of this character which features a novel "jump scale" arrangement characterized by its simplicity and absence of any moving parts.

The term "jump scale," as used herein, has reference to an arrangement incorporating two meters, one a so-called "foot" meter and the other a so-called "inch" meter. These two meters are actually voltmeters calibrated respectively in terms of feet and inches. Whereas the inch meter reads fractional portions of an inch, the foot meter is so arranged that its indicating pointer is positioned either at the zero, 1, 2, 3 and so forth indication and such indicating pointer is incapable of assuming a position intermediate a full foot. In other words, in operation of the arrangement, the indicating pointer for the foot meter "jumps" from one scale division, to the next adjacent scale division in one step. Thus, the foot meter reads feet directly without interpolation since its pointer is arranged to "jump" from one scale division to the next adjacent scale division.

A specific object of the present invention is to provide improved equipment of this character which incorporates two meters, both of such meters being subject to a varying electrical quantity which represents a condition, but one of such meters being energized in such a manner that its indicating pointer jumps from one scale division to the next adjacent scale division.

Another specific object of the present invention is to provide equipment of this character which is productive of the feature mentioned in the preceding paragraph, without the use of movable elements comprising, for example, a relay.

Another specific object of the present invention is to provide apparatus of this character which is adaptable to be operated in conjunction with other identical equipment whereby the condition, i. e., liquid level in a remotely located tank, may be indicated simultaneously at a plurality of differently located stations.

Another specific object of the present invention is to provide improved equipment of this character which is adaptable to indicate the liquid level in any one of a plurality of differently located tanks.

Another specific object of the present invention is to provide equipment of this character which indicates the liquid level in a remotely located tank by measuring the voltage output of so-called tank transmitter units which are located at the tank.

Another specific object of the present invention is to provide an arrangement of this character which is capable of indicating the liquid level in a remotely located tank within a range of, for example, sixty feet.

Another specific object of the present invention is to provide an arrangement of this character in which compensation for the voltage drop in the leads extending from the tank to the indicating station is obtained in a simple expeditious manner.

Another specific object of the present invention is to provide an arrangement of this character in which the meters for reading feet and inches may be calibrated in a simple expeditious manner, taking into account, different voltage drops which may exist between the indicating station and the tank at which the liquid level is measured.

Another specific object of the present invention is to provide an arrangement of this character in which the "foot" meter pointer moves in exactly one foot increments thereby eliminating the need for interpolating to obtain the correct reading.

Another specific object of the present invention is to provide an arrangement of this character which incorporates novel means for connecting the output of one of a plurality of selectable tanks to a common receiving apparatus which incorporates the aforementioned foot meter and inch meter.

Another specific object of the present invention is to provide an improved "jump scale" arrangement of this character which does not require the use of moving elements, such as for example, the movable element of a relay to effect the desired result.

Another specific object of the present invention is to provide apparatus of this character in which the liquid level in a single tank may be indicated by identical receiving apparatus located at different receiving stations, the arrangement being featured by the fact that it incorporates means for eliminating substantially the loading effect of one of the receiving apparatus on the other receiving apparatus.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 represents a portion of the apparatus illustrated in Figure 1 in more simplified form for more clearly illustrating the operation and underlying concepts of the invention embodied in the apparatus illustrated in Figure 1;

Figure 5:
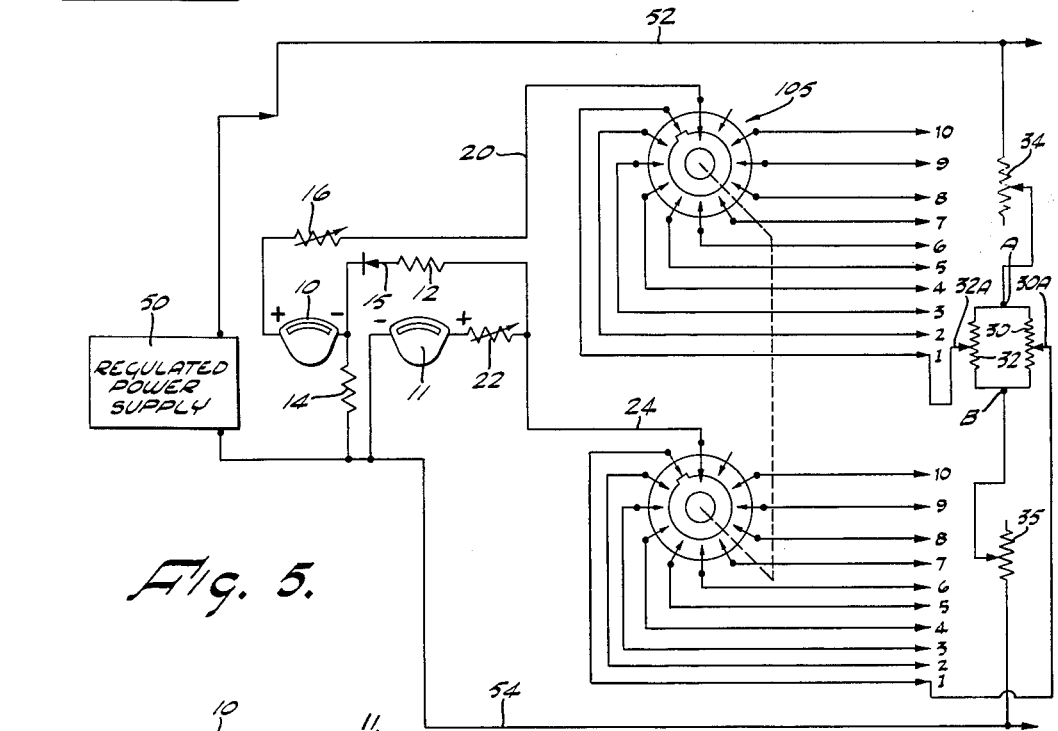
Figure 6:
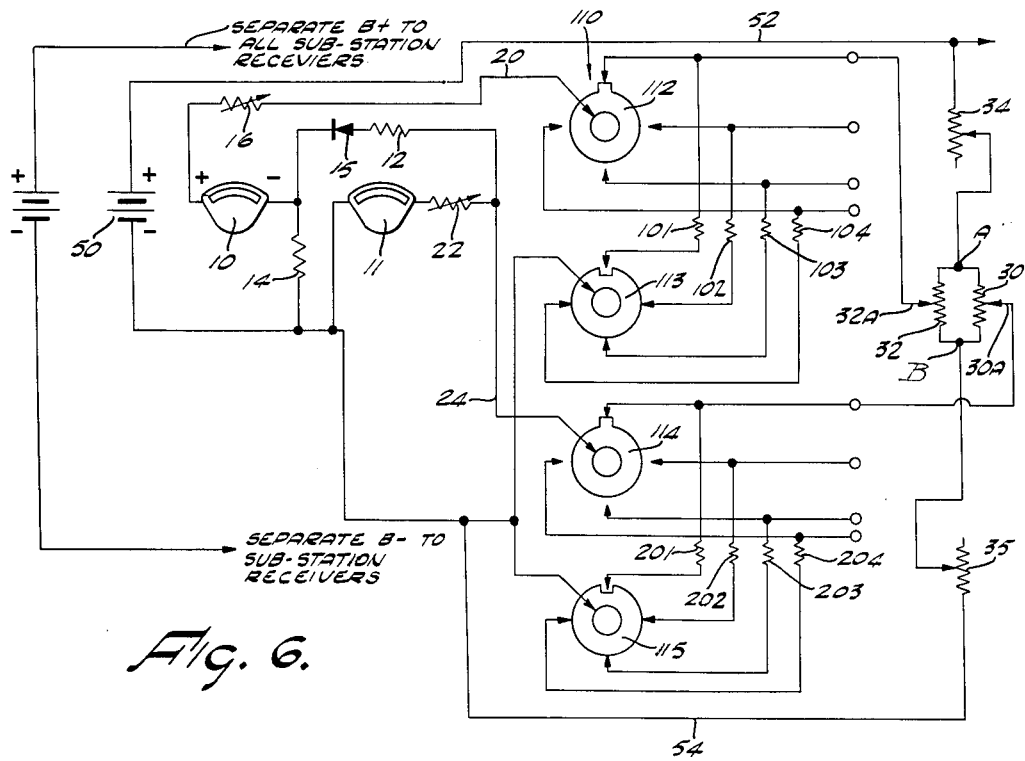
Figure 8:
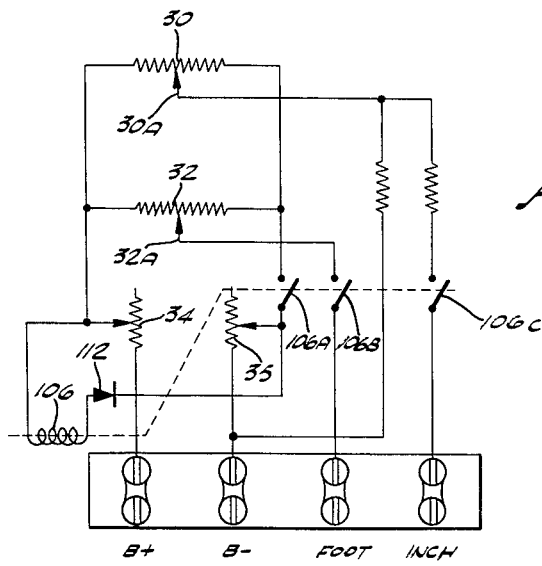

Figure 5 serves to illustrate apparatus whereby the liquid level in one of a plurality of selectable tanks may be indicated on one common receiving apparatus;

Figure 6 illustrates apparatus useful, in accordance with features of the present invention, for producing an indication of the liquid level of a single tank at a plurality of different indicating stations simultaneously;

Figure 7 illustrates apparatus used in conjunction with the receiving apparatus for calibrating the same as well as a selector switch associated with the receiving apparatus, the apparatus illustrated in Figure 7 being intended to be used in conjunction with and connected to a plurality of transmitter units, one of such units being illustrated in Figure 8;

Figure 8 shows in schematic form transmitting apparatus located at each tank with an associated relay whereby the liquid level at a selected tank may be transferred and read or indicated by the receiving equipment illustrated in Figure 7;

Figure 9 illustrates the electrical connections to the transmitter unit associated with and located at a tank, such transmitting apparatus being connectable to the receiving equipment as illustrated in Figure 5.

Figure 1:
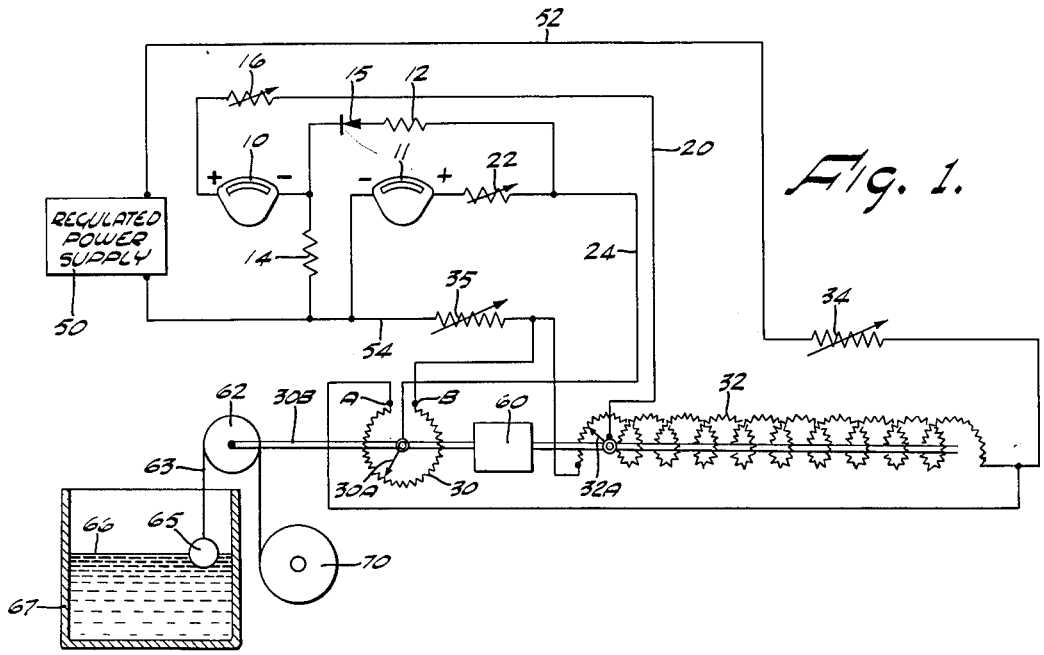
Figure 1 represents, partly in schematic form, and partly in structural form, a system for indicating the liquid level in a tank, in accordance with features of the present invention.

All of the arrangements illustrated herein include the basic features of the apparatus illustrated in Figures 1 and 2. The equipment consists essentially of four items namely, a so-called transmitter unit, a receiving unit, a regulated power supply for energizing the transmitting and receiving equipment, and a mechanical float system which is suitably mechanically coupled to the movable potentiometer arms or taps of the so-called inch potentiometer and foot potentiometer in the transmitter unit.

The aforementioned receiving unit comprises essentially the following elements, namely, the foot meter 10, the inch meter 11, a voltage dividing network comprising resistances 12 and 14, an isolation or decoupling diode 15, a so-called "full scale calibration" adjustable resistance 16 which is serially connected between the positive terminal of meter 10 and the so-called "foot lead" 20, and the so-called "full scale calibration" adjustable resistance 22 which is serially connected between the positive terminal of the inch meter 11 and the so-called "inch lead" 24.

Each transmitting unit includes a so-called inch potentiometer resistance 30, a foot potentiometer resistance 32, a line compensation resistance 34 and a line compensation resistance 35.

The aforementioned regulated power supply is considered of conventional circuitry and is indicated in block diagram form at 50, the positive terminal of source 50 is connected through the so-called B+ lead 52 to one terminal of the line compensation resistance 34, and the negative terminal of the source 50 is connected by lead 54 to one terminal of the other line compensation resistance 35. The float operated mechanism for moving the taps on resistances 30 and 32 forms, per se no part of the present invention and the same is represented in somewhat diagrammatic form in Figures 1 and 2. In Figure 1, the rotatable tap 30A of resistance 30 is geared through gearing 60 to the rotatable tap 32A of resistance 32, such gearing having a ratio of six to one, so that the tap 32A rotates at one-sixth of the rotational speed of tap 30A. The shaft 30B of the potentiometer resistance 30 is shown as mounting the sprocket wheel 62 over which the perforated tape 63 travels. One end of the tape 63 is attached to the float 65 which follows the level of the liquid 66 in tank 67, the other end of tape 63 being shown as reeled on the take-up reel 70.

The potentiometer resistance 30 is shown, and is preferably of the so-called one turn continuous type in that the rotatable tap 30A may rotate through more than 360° and in doing so, is found in a position between the resistance taps A and B where such movable tap 30A does not contact any portion of the resistance strip which comprises the potentiometer resistance 30. On the other hand, the potentiometer resistance 32 has ten turns. One turn of the resistance 30 corresponds to a change in liquid level of 12". This means that one revolution of the rotatable tap 32A corresponds to a change in liquid level of six feet. Since there are ten turns on the potentiometer resistance 32, such ten turns correspond to a change in liquid level of sixty feet. It is observed that the terminals A of resistances 30 and 32 are both connected to the B+ lead 52 and that the terminals B of the same resistances 30 and 32 are connected to the B— lead 54, so that the same voltage exists across both resistances 30 and 32. This means that for a given incremental change in rotational position of the shaft 30B, the voltage change at the movable tap 30A is sixty (six times ten) times the corresponding voltage at tap 32A. The voltage on tap 30A is applied to the inch meter 11; and is likewise applied to the voltage dividing network comprising resistances 12 and 14, such resistances 12 and 14 being so proportioned that one-sixtieth of the voltage appearing at tap 30A appears across the resistance 14. Resistance 14 has one of its terminals connected to the negative post of the foot meter 10 which is essentially a voltmeter, the other terminal of resistance 14 being connected to the B— lead 54. On the other hand, the full voltage appearing on the tap 32A is applied to the positive terminal of the foot meter 10. The diode 15 serves essentially as an isolation element to prevent the foot voltage from energizing the inch circuitry.

Figure 3:
Figures 3 and 4 illustrate, the nature of the markings on the scale of the foot meter and inch meter, respectively, illustrated in Figure 1.
Figure 4:
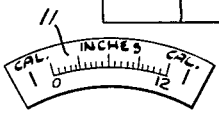

The two voltmeters 10 and 11 are calibrated in linear measurements, the meter 11 being calibrated in terms of inches and the meter 10 being calibrated in terms of feet as indicated in Figures 3 and 4.

It is observed that the voltage of source 50 supplied to the potentiometer resistances 30 and 32 is electrically equal to the maximum range of the transmitters, such maximum range being sixty feet. It is also observed that the output of the transmitter appearing on the leads 20 and 24 is a voltage which bears the same relationship to the maximum voltage as the tank level does to sixty feet. Since the liquid level, through the float movement, determines the position of the potentiometer sliders or taps 30A and 32A, an indication of liquid level is accurately provided.

One of the important features of the present invention resides in the so-called "scale jump" circuit which is now described in detail with respect to its operation. It will be observed that this feature provides movement of the foot meter pointed in exactly one foot increments thereby eliminating the need for interpolating to obtain the correct reading.

The operation of the scale jump circuit is now described under the assumption that the liquid level is increasing and in such case, the potentiometer taps or sliders 30A and 32A move toward the A contact on the corresponding resistances 30 and 32 as indicated by the arrows 81 and 82 in Figure 2. It is apparent that the inch slider or tap moves sixty times faster along the resistance element 30 than the foot potentiometer slider 32A so that the inch voltage increases sixty times faster than the foot voltage. With both the inch and foot voltages increasing in this manner, the pointers of both meters 11 and 10 tend to move up scale. It is desirable that the pointer of the inch meter moves in a continuous manner to serve as an indication that the liquid level is changing, i. e., in this case increasing. It is not necessary that the pointer of the foot meter 10 move until the pointer of the inch meter passes the 12" mark and starts over on the next foot. As mentioned previously, the voltage developed on the inch slider 30A is applied to a sixty to one voltage dividing network so that one-sixtieth of the inch voltage appears across resistance 14. This voltage developed across resistance 14 is equal to the increase in the foot voltage. It is observed that one-sixtieth of the change in inch voltage is applied to the negative terminal of meter 10 while the increase in foot voltage is applied to the positive terminal of meter 10 so that these two voltages which are a measure of the increase in liquid level cancel out, but the meter 10 montinues to read what may be referred to as a static level, i. e., to produce a reading of exact footage. This is so since there are in effect three voltages being fed to the foot meter 10; one can be considered as the static foot voltage representing liquid height in feet; one represents the increasing foot voltage and the other is one-sixtieth of the increasing inch voltages. As indicated previously, the second two voltages are in opposite polarity to each other and their effects cancel, leaving only the static foot voltage which is read by meter 10. This state continues until the 12" position is reached by the inch slider 30A, i. e., until such slider reaches the terminal A. Thereafter, in continued movement of the slider, it is in an intermediate position between terminals A and B wherein no or zero inch voltage is applied to the inch lead 24. In this latter condition, no voltage, for cancellation purposes, is applied to the resistance 14 and the increased foot voltage, in that case, since it is not cancelled out, causes the pointer of the foot meter 10 to jump to the next scale reading. In continued movement of the slider 30A in the direction indicated by the arrow 82 in Figure 2, the slider 30A engages the contact B and then proceeds around the resistance 30 to the contact A. This action, of course, is repeated for each foot of tank increase and, is of course, repeated in an inverse manner for each foot of tank decrease. The purpose of the isolation diode 15 in the scale jump circuit is to isolate the circuit in such a manner that the foot voltage developed on lead 20 cannot effect the reading on the inch meter 11.

The adjustable resistances 34 and 35 provide compensation for the voltage drop existing in the leads extending from the transmitter unit to the receiver unit. These compensating resistances 34 and 35 are located at each transmitter unit as shown in Figure 9. The method of providing compensation may perhaps be understood by reference to Figure 2. The system is designed for a greater voltage drop in the leads than will actually occur in a practical installation. It is observed that even with the slider 30A at the zero end of the potentiometer, i. e. terminal B, a voltage appears on the meter 11 due to the current flow through the line risistance. Allowance is made for this residual voltage or current flow on the meter scale as seen in Figures 3 and 4. The space between the "CAL" and "zero" marks and the "60" or "12" and "CAL" marks represents the amount of scale spread and voltage allowance made for the line voltage drop. Since a greater allowance has been made than is actually required, it is necessary to increase the line voltage drop. This is accomplished by inserting increased resistance as represented by the resistances 34 and 35 in the power leads between the power supply 50 and the transmitter. For this purpose, the resistances 34 and 35 are adjusted to insert the correct resistance as indicated by the reading at the receiver unit. Once adjusted, no further attention is required.

It is observed that the length of the inch and foot leads 24 and 20, respectively, which carry the transmitter output back to the receiver are required to carry only about .0005 ampere maximum and so that the length does not effect the gauge reading appreciably. The input resistance to the meter circuits is approximately 160,000 ohms. The maximum possible line resistance of the inch and foot leads 24 and 20 are never more than a very small percentage of this figure and, therefore, can for all practical purposes, be neglected.

The receiver is calibrated using circuitry illustrated in Figure 7. The necessary calibration voltage points are available by operating the so-called calibration switch 90 which has four positions, namely (1) an "off" position, (2) an "operate" or "OP" position, (3) a so-called "A" position and (4) a so-called "B" position. In the "off" position of switch 90, voltage developed in the power supply is disconnected from the receiver unit. In the second or OP position, power is connected to the receiving unit and the inch and foot meters are connected respectively to the inch lead 24 and foot lead 20 and the system is operative to gauge, i. e., produce an indication of the liquid level in the associated tank. In the A position of switch 90, the foot meter 10 is short-circuited and the pointer of such meter is adjusted to coincide with the left CAL mark (Figure 3) by adjusting the mechanical meter zero adjustment conventionally associated with a voltmeter, such foot meter 10 being a voltmeter with a suitably calibrated scale. With such calibration switch 90 in the A position, the inch meter 11 is connected to the B+ lead and the pointer of such inch meter moves up scale to the right-hand CAL mark in Figure 4. The pointer of the inch meter is adjusted exactly to such CAL mark by adjustment of the calibration resistance 22. With the switch in the B position, the opposite is true, that is, the foot meter pointer moves up scale to the high end or right-hand CAL mark in Figure 3 and the inch meter pointer drops to the low end or left-hand CAL mark in Figure 4. In such case, the mechanical zero adjustment mechanism associated with the inch meter is adjusted so that the pointer corresponds exactly with the CAL mark; and the resistance 16 (Figure 7) is adjusted so that the foot meter pointer registers exactly with the right-hand CAL mark in Figure 3. Since the voltage used for meter calibration is a regulated one, and is the same as is used to energize the transmitter potentiometer resistances 30 and 32, it is readily seen that the accuracy of the system at each end of the scale is limited essentially by the accuracy to which the meter adjustments are made as described above.

The system is described above in relationship to obtaining readings as to the liquid level in only one tank, but the system is adaptable to read the liquid level in one of a plurality of selected tanks, using for that purpose only one receiving unit with, of course, a separate transmitter unit associated with each individual tank. Two arrangements for this purpose are described herein, namely, the arrangement illustrated on the one hand in Figures 5 and 9, and on the other hand in Figures 7 and 8.

Referring to the system illustrated in Figures 5 and 9, each tank has associated therewith a transmitter unit illustrated in Figure 9, it being noted that the potentiometer sliders 30A and 32A are movable by a float actuated mechanism as illustrated in Figure 1. Each transmitter unit is connected in parallel across the B+ and B— leads as illustrated in Figure 5 with all of the transmitters thus being energized at the same time. Since all of the transmitters have the power supply voltage applied across the potentiometer resistance elements, voltage is present at the sliders 30A and 32A of all of the transmitters. Lines 1–10 both inclusive as indicated in Figure 5, are connected between the inch and foot sliders of each transmitter and receiver thereby applying the voltage or information from each transmitter to the receiver. These information lines are terminated at the multipoint selector switch 105 in the receiver comprising two movable elements which are ganged together. The center pole of the selector switch is connected to the meter circuits. The result is that the meters are selectively connected by the switch 105 to the desired inch and foot leads. It is observed that although the receiver is effectively connected to only one pair of information leads at any time, the other leads also have the tank level information existing on them. This allows for the use of various accessories to be connected to the lines to give continuous control or other indication, such as alarms. The other system illustrated in connection with Figures 7 and 8 incorporates a relay at each transmitter unit as illustrated in Figure 8, such relay having an energizing winding 106 and three normally open switches 106A, 106B and 106C. When the relay winding 106 is energized, the foot and inch leads are connected to the receiver and also the power supply is connected to the transmitter unit. The foot and inch leads are common to all transmitters, this pair being connected to the potentiometers 30 and 32 when the transmitter relay is energized. As illustrated, the switching system uses six B+ leads and as many B— leads as are required for the number of tanks (four B— leads for twenty-four tanks). The selector switch 110 in Figure 7 which includes two movable elements ganged together, serves to switch both the B— and B+ leads. Only one of the B+ and B— leads, however, are connected in any tank selector position. There may be several transmitters connected to the same B+ lead but of this group, no two are connected to the same B— lead. By this arrangement, the permissible number of transmitters is the product of the number of B— and B+ leads. In order to avoid difficulties as a result of circulating currents, blocking or isolation rectifiers 112 are serially connected with a corresponding relay coil 106. Since only one transmitter is energized at any one particular time in the arrangement illustrated in Figures 7 and 8, the current requirements are relatively low, resulting in small gauge wiring and low power requirements.

Figure 6 shows a system for obtaining liquid level readings in one or more tanks at two receiver locations. The system is such that readings may be had at two locations from the same tank simultaneously or the receivers at the different stations may each read different tank levels at the same time. In this system, in Figure 6, each transmitter unit which comprises the potentiometer resistances 30 and 32 and line compensating resistances 34 and 35, is continuously energized so that there is an output voltage available at the sliders 32A and 30A indicative of the liquid level. The system illustrated in Figure 6 is wired essentially as the system illustrated in Figures 5 and 9.

One feature of the system illustrated in Figure 6 is the fact that the loading effect of different parallel connected receiving units is taken into account and corrected.

In the systems described previously, the assumption is made that the output of the transmitter potentiometers 30 and 32 is linear with relationship to mechanical movement of the float. This is strictly true only when there is no electrical load present at the slider of the potentiometer, i. e., no current flows through the slider. When there is a load such as a receiving unit connected to the sliders, some current flows through such load and through only a portion of the potentiometer resistance element.

Due to the loading effect loading resistors 101, 102, 103, 104, 201, 202, 203 and 204 are provided, such loading resistances being switched in the circuitry upon operation of the switching means 110 which includes the rotary switch elements 112, 113, 114 and 115, all being ganged for joint movement.

It is possible to calibrate the receiver units according to the increased load and thereby obtain correct readings when individual receivers are not switched in and out. In a system as illustrated in Figure 6 wherein different receiving units are switched to different transmitter units, the use of loading resistors as illustrated in Figure 6 is highly desirable for purposes of accuracy. It is observed that a loading resistor is connected between each of the incoming information lines (both foot and inch leads) and the B— lead. These loading resistors are equal in value to the effective load of one receiving unit. The switch 110 which is used to select the particular loading resistors is that type that provides a connection to all of the load resistors except one. One pair of load resistors is disconnected for any switch position; and the particular resistor which is disconnected is that one corresponding and previously connected to the information lead of the tank whose liquid level is being determined. In a system as illustrated in Figure 6 when two receivers and several transmitters are included in one system, the operation may briefly be described as follows. First, consider that both of the receivers are turned to an inactive position, i. e., one that does not have a transmitter connected. With the receivers in this condition, if the information leads from the transmitters are considered, it is observed that they are connected to a load resistor at each receiver and since each load resistor is equal in magnitude to the resistance offered by one receiver, the load on any information lead is equal to the loading of two receivers and the output voltage from the transmitters is a correct representative voltage. When one of the receivers is connected to a tank transmitting unit, the switch 110 disconnects the load resistors for that particular tank and connects the receiver meters to the transmitter unit. In such cases, there is one pair of loading resistors and one receiver connected to the transmitter and since the loading is equal to a two-receiver load, the voltage being measured is a correct representative voltage. In the event that the other receiver is switched to the same transmitter unit, its loading resistor corresponding to that tank is disconnected and the meters of the receiving unit are connected in a two-receiver load as before. Considering the complete system, it is readily seen that at all times the transmitting units are presented with a two-receiver load regardless of the position of the receiver selector switch 110 and, furthermore, that the system is designed and calibrated such that it will indicate the correct reading when a two-receiver load is present.

It is noted, while there is a point in the rotation of the movable tap 30A of the potentiometer resistance where such tap does not contact the associated resistance element, it is desirable that this point, which is usually termed the "break" point, be kept as small as possible. Thus, the movable contact 30A is in contact with the associated resistance element for about 359° of rotation and is not in contact for the remaining 1°.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A pair of potentiometer resistances connected in parallel, each one of said potentiometer resistances having a tap, a source of voltage, a first line compensation resistance connected between one terminal of said source and one terminal of said potentiometer resistances, a second line compensation resistance connected between the other terminal of said source and the other terminal of said potentiometer resistances, the taps on said potentiometer resistances being arranged for joint movement, a first meter connected between the tap on a first one of said potentiometer resistances and said other terminal of said source, a voltage dividing network connected between the tap on said first potentiometer resistance and said other terminal of said source, a second meter having one of its terminals connected to the tap on a second one of said potentiometer resistances, the other terminal of said second meter being connected to a point in said voltage dividing network, said voltage dividing network including a blocking rectifier connected in series in said network between said other terminal of said second meter and said tap on said first resistance to prevent the flow of current from said second meter to said first meter.

2. In an arrangement of the character described, a plurality of transmitter units, each transmitter unit comprising a first and a second parallel connected resistance potentiometer, a single receiving unit, a single source, said source having its opposite terminals connected to opposite terminals of each transmitting unit, said receiving unit comprising a first meter, a first lead, a voltage dividing network connected in parallel with said first meter and having one terminal thereof connected to said first lead, the other terminal of said voltage dividing network being connected to one terminal of said source, first switching means connected to said first lead, the movable tap on a first resistance of each transmitting unit being connected to different spaced contacts on said first switching means, a second meter having one of its terminals connected to a point in said voltage dividing network, said voltage dividing network including a blocking rectifier connected in series between said one terminal of said second meter and said first lead to prevent the flow of current from said second meter to said first meter, second switching means having a contact element thereof connected to the other terminal of said second meter, said second switching means having space contacts thereon connected to different taps on the second resistance of the transmitting unit.

3. In an arrangement of the character described, a plurality of transmitting units, each transmitting unit comprising a first potentiometer resistance and a second potentiometer resistance, said first and second potentiometer resistances being connected in parallel, a relay associated with each transmitting unit, said relay having an energizing winding and three switches, a single receiving unit comprising a first meter, and a second meter, a voltage dividing network connected in parallel with said first meter, a source of voltage, one terminal of said voltage dividing network and said first meter being connected through one of said switches to the tap on the first resistance, the other terminal of said voltage dividing network and said first meter being connected to one terminal of said source, a second meter having one of its terminals connected to a point in said voltage dividing network, said voltage dividing network having a blocking rectifier connected in series therewith between said one terminal of said second meter and said tap on said first resistance to prevent the flow of current from said second meter to said first meter, the other terminal of said second meter being connected through a second one of said switches to the tap on said second resistance, said one terminal of said source being connectible through the third one of said switches to one terminal of said first and second resistances, the other terminal of said first and second resistances being connected to the other terminal of said source, and means for selectively connecting said source to a selected one of the relay windings.

4. In an arrangement of the character described, a transmitter unit comprising a first and a second parallel connected potentiometer resistance, a plurality of receiving units interconnectible with said transmitting unit, a source having its opposite terminals connected to opposite terminals of said resistances, each of said receiving units comprising: a first meter, a second meter, a voltage dividing network connected in parallel with said first meter, one terminal of said first meter and said voltage dividing network being connected to one terminal of said source, the other terminal of said first meter and said voltage dividing network being connectible through first switching means to the tap on said first potentiometer resistance, said second meter having one of its terminals connected to a point in said voltage dividing network, said voltage dividing network including a blocking rectifier connected in series in said network between said one terminal of said second meter and said tap on said first potentiometer resistance to prevent the flow of current from said second meter to said first meter, the other terminal of said second meter being connectible through second switching means to the tap on said second resistance, a plurality of loading resistances each connected together between the tap on said first resistance and one terminal of said parallel connected resistances, a second plurality of loading resistances, each being selectively connectible between the tap on said second resistance and one terminal of said parallel connected resistances, and means including third and four switching means operated jointly with said first and second switching means for disconnecting selected loading resistances.

References Cited in the file of this patent

UNITED STATES PATENTS

| | | |
|---|---|---|
| 1,898,182 | Harrison | Feb. 21, 1933 |
| 1,964,228 | Tanner | June 26, 1934 |
| 2,003,681 | Doyle | June 4, 1935 |
| 2,089,701 | Linderman | Aug. 10, 1937 |
| 2,631,778 | Piper et al. | Mar. 17, 1953 |

FOREIGN PATENTS

| | | |
|---|---|---|
| 657,031 | Great Britain | Sept. 12, 1951 |